United States Patent [19]
Fuji et al.

[11] Patent Number: 5,315,567
[45] Date of Patent: May 24, 1994

[54] OPTICAL DISK FORMATTING SYSTEM USING INDEX MARK DETECTING CIRCUIT

[75] Inventors: Hiroshi Fuji, Nara; Hirotsugu Matoba, Sakurai, both of Japan

[73] Assignee: Sharp Kabushiki Kaisha, Osaka, Japan

[21] Appl. No.: 794,490

[22] Filed: Nov. 19, 1991

[30] Foreign Application Priority Data

Nov. 20, 1990 [JP] Japan ................ 2-316365

[51] Int. Cl.$^5$ ................................. G11B 7/00
[52] U.S. Cl. ........................ 369/32; 369/13; 369/48; 369/44.26
[58] Field of Search ........... 369/32, 44.78, 13, 44.76, 369/44.75, 47, 48, 50, 124

[56] References Cited

U.S. PATENT DOCUMENTS

| | | | |
|---|---|---|---|
| 4,833,662 | 5/1989 | Yoda | 369/13 |
| 4,858,214 | 8/1989 | Baba | 369/32 |
| 4,907,216 | 3/1990 | Rijnsburger | 369/275 |
| 5,093,819 | 3/1992 | Kimura | 369/48 |
| 5,109,369 | 4/1992 | Maeda et al. | 369/32 |
| 5,119,363 | 6/1992 | Satoh et al. | 369/50 |
| 5,177,718 | 1/1993 | Takeuchi | 369/32 |

FOREIGN PATENT DOCUMENTS

| | | |
|---|---|---|
| 0081133 | 6/1983 | European Pat. Off. . |
| 0166199 | 1/1986 | European Pat. Off. . |
| 0326437 | 8/1989 | European Pat. Off. . |
| 0347858 | 12/1989 | European Pat. Off. . |
| 0378394 | 7/1990 | European Pat. Off. . |
| 0423731 | 4/1991 | European Pat. Off. . |
| 58-155549 | 9/1983 | Japan . |
| 60-022738 | 2/1985 | Japan . |
| 1008563 | 1/1989 | Japan . |
| 1060823 | 3/1989 | Japan . |
| 2054429 | 2/1990 | Japan . |

OTHER PUBLICATIONS

Patent Abstracts of Japan vol. 9, No. 276 (P-402) Nov. 1985, & JP-A-60 121 553 (Matsushita) Jun. 20, 1985.
Patent Abstracts of Japan vol. 12, No. 240 (P-727) Jul. 8, 1988, & JP-A-63 032 751 (Konika) Feb. 12, 1988.
Patent Abstracts of Japan vol. 13, No. 064 (P-827) Feb. 14, 1989, & JP-A-63 251 938 (Seiko Epson) Oct. 19, 1988.

Primary Examiner—Robert J. Pascal
Assistant Examiner—Tan Dinh
Attorney, Agent, or Firm—David G. Conlin; George W. Neuner

[57] ABSTRACT

An optical disk according to the present invention has thereon an uninterrupted preformed groove adjoining a track. The address information of the track and sectors is prerecorded by variations in the preformed groove in a radial direction of the optical disk. An optical disk drive converts a detection signal, that is generated when the spot of a light beam crosses the track, into a binary signal in accordance with the comparison between the detection signal and two different slice levels, whereby a correct track crossing number is obtained. Another optical disk has thereon index marks that are prerecorded by partially varying the width of the preformed groove. Another optical disk drive detects the index mark on a specific track line, whereby formatting data with respect to address information is generated. The optical disks and optical disk drives are thus compatible with writing of the address information by means of soft-formatting.

9 Claims, 16 Drawing Sheets

FIG. 15(a)
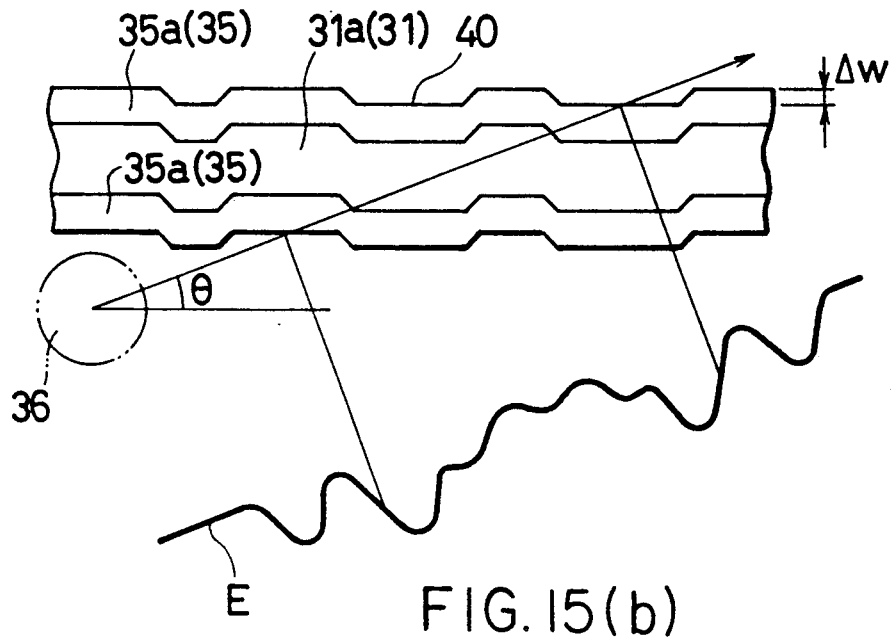
FIG. 15(b)
FIG. 16(a)
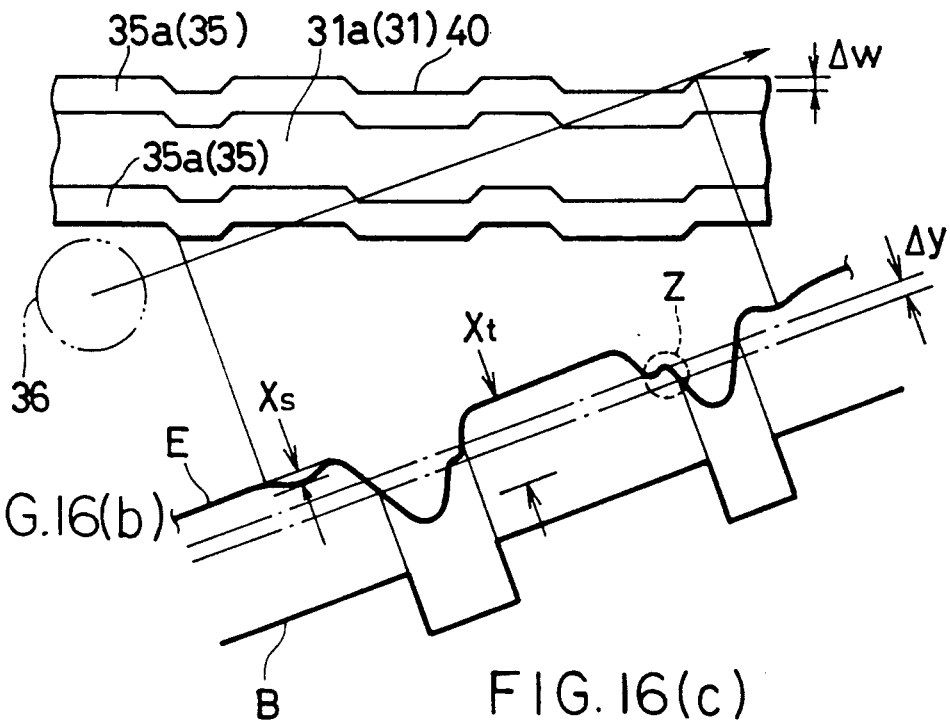
FIG. 16(b)
FIG. 16(c)

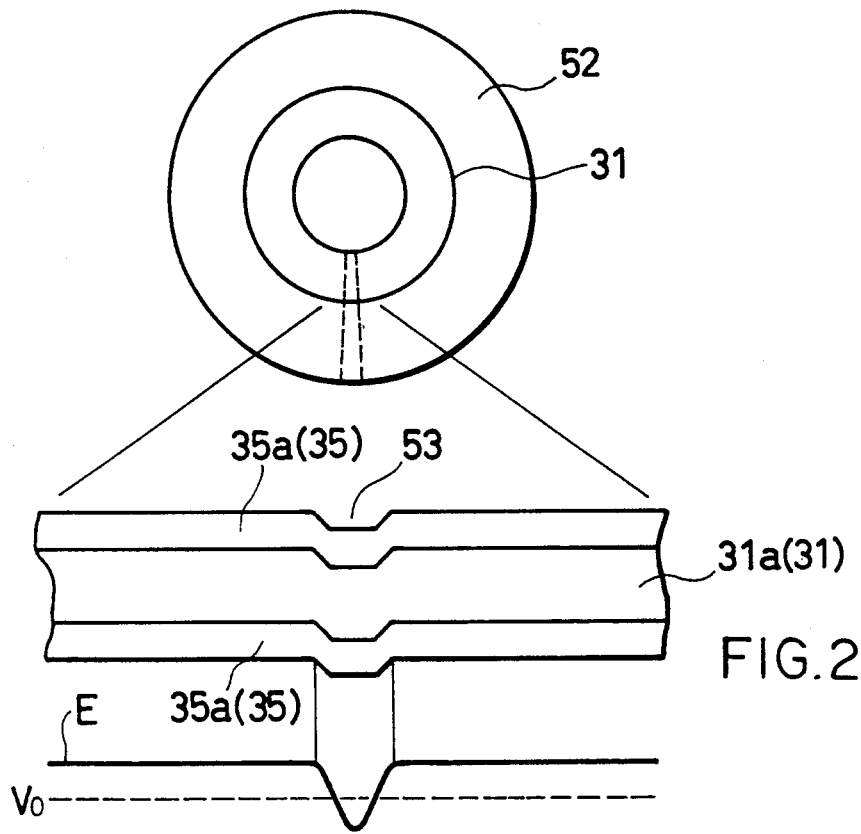
FIG. 20(a)
FIG. 20(b)
FIG. 20(c)
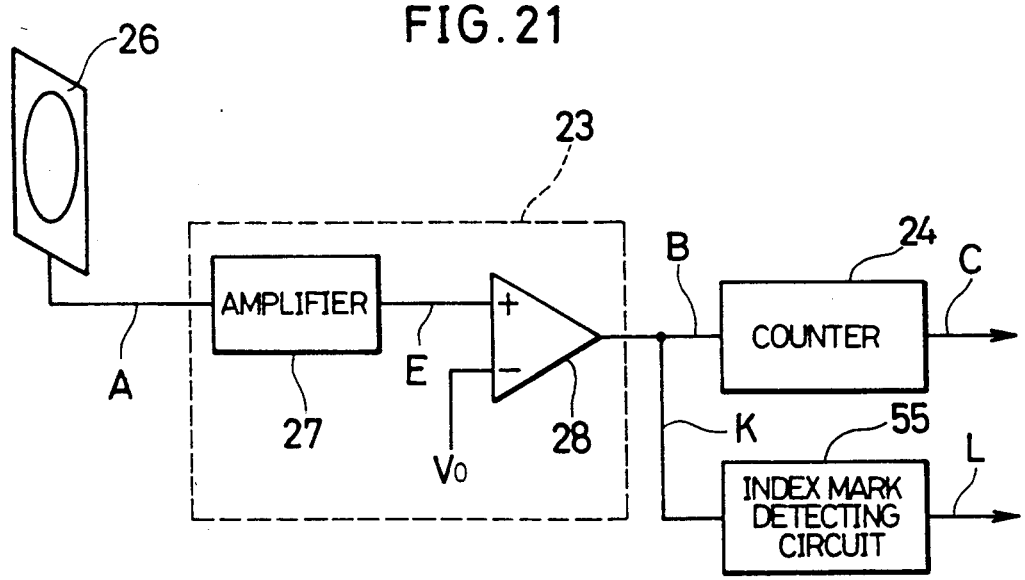
FIG. 21

FIG. 22
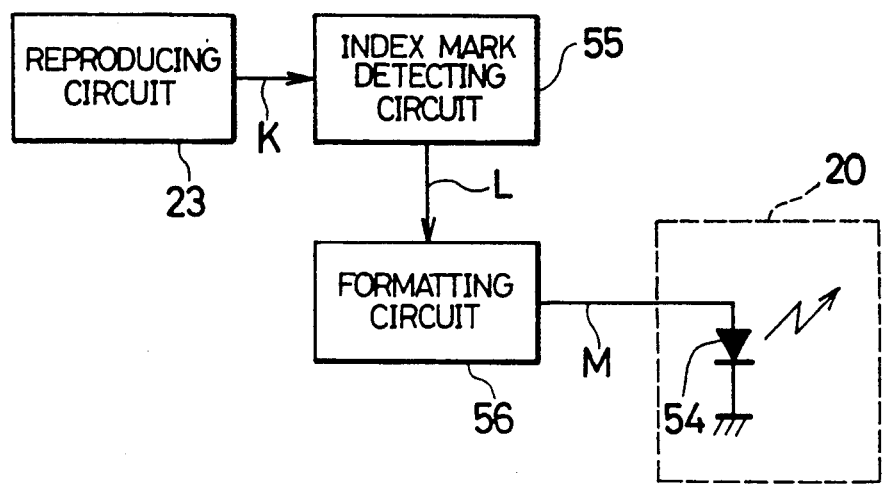
FIG. 23(a)
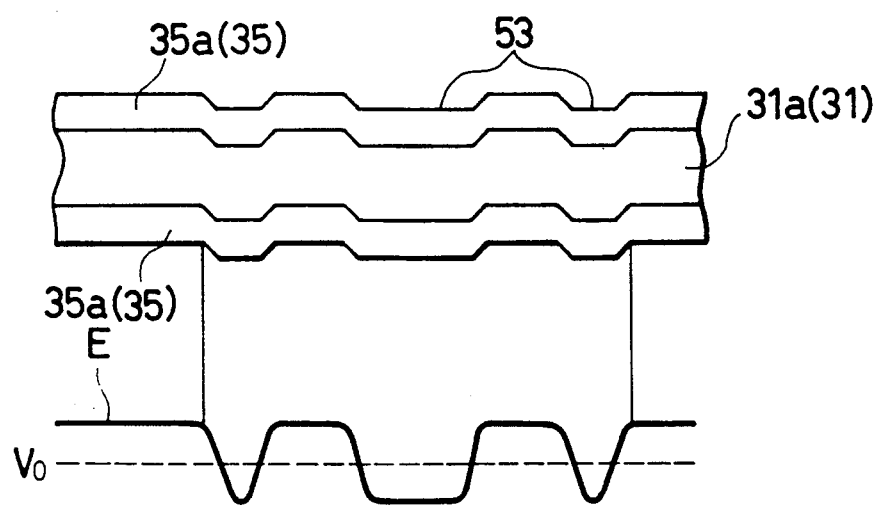
FIG. 23(b)

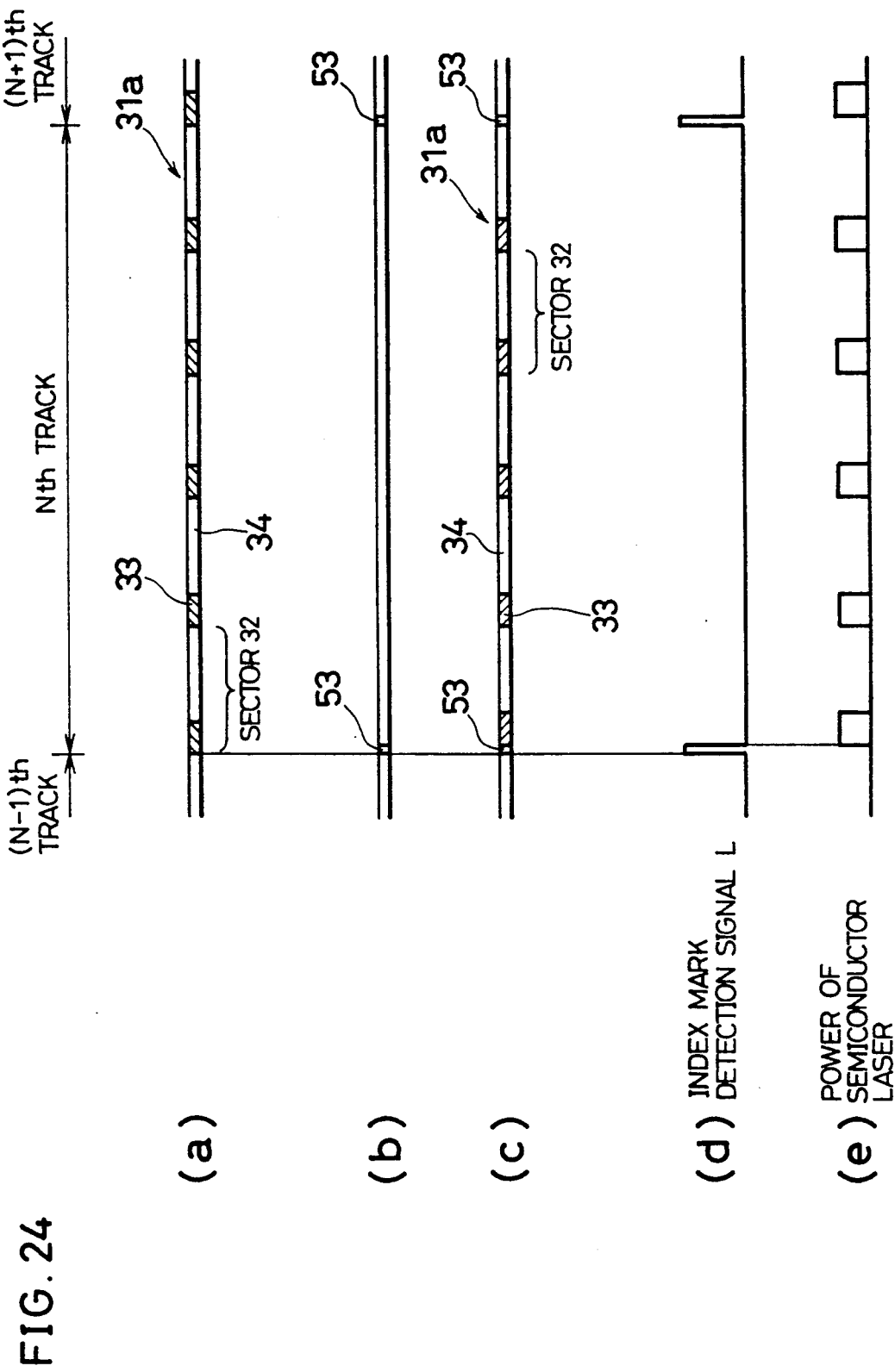

OPTICAL DISK FORMATTING SYSTEM USING INDEX MARK DETECTING CIRCUIT

FIELD OF THE INVENTION

The present invention relates to an optical disk and to an optical disk drive which records, reproduces and erases information on/from the optical disk by projecting a light beam.

BACKGROUND OF THE INVENTION

On a conventional optical disk, generally, information (hereinafter referred to as address information) indicating the addresses of track and sectors is prerecorded in the forms of bumps and pits at manufacture (the bumps and pits providing the address information, hereinafter referred to as address marks). The allocation of data thus prerecorded on an optical disk is called pre-format or hard-format. Recording, reproduction and erasing of desired information are carried out while optically detecting the address information with an optical head of an optical disk drive and identifying a desired track address and sector address.

Regarding the address marks, as illustrated in FIG. 27, marks 2 may be intermittently formed on the track provided between preformed grooves 1 on the optical disk. Also as illustrated in FIG. 29, marks 4 may be formed by partially interrupting grooves 3.

A desired location on the optical disk is accessed by access process including track seeking and sector searching operations. In the track seeking operation, the optical head is moved in a radial direction of the optical disk towards a desired location. In the following sector searching operation, the optical head waits for a specified sector to come to a projection position of a light spot on the optical disk by rotation.

On the optical disk disclosed in the Japanese Publication for Unexamined Patent No. 64-60823/1989, address marks are formed separately from the preformed grooves. In this configuration, during track seeking, the number of tracks crossed by a light spot is counted in accordance with a crossing signal which is detected when the light spot crosses the preformed groove. Then, the optical head is moved in a radial direction of the optical disk towards a location on the optical disk, calculated according to the numerated data.

However, as illustrated in FIG. 27, when the marks 2 are written between the preformed grooves 1, sometimes the light spot of a laser light beam 5 emitted by the optical head crosses not only the preformed groove 1 but also the mark 2 as shown by arrow $\alpha$ during track seeking. This causes a signal that is generated as the light spot 5 crosses the mark 2 to be added to a track crossing signal EE (see FIG. 28). As a result, three pulses are generated as shown by the dotted line instead of two expected pulses that correspond to two preformed grooves 1 adjoining the mark 2. Moreover, when the intervals between the preformed grooves 1 and the mark 2 are small, only one pulse as illustrated by the solid line may be generated with respect to the two preformed grooves 1 and mark 2. Such incorrect numbers of pulses cause errors in counting of the track crossing number.

Meanwhile, as illustrated in FIG. 29, when the marks 4 are formed by the intermittent preformed grooves 3, sometimes the light spot 5 crosses a blank area containing no mark as shown by arrow $\alpha$. This causes a problem that a track crossing signal EF (see FIG. 30) is not detected even when the light spot 5 crosses the track.

With the above-mentioned method, since the address information of track and sectors are prerecorded as address marks in the form of bumps and pits, the format is inflexible. Therefore, the user can not freely change the format of the optical disk after manufacturing, and consequently the use of the optical disk is limited.

On the contrary, information such as address information is magnetically written on a conventional floppy disk after the floppy disk is manufactured. This method is hereinafter called soft-formatting. In other words, as illustrated in FIG. 31 and FIG. 32, a floppy disk 6 is provided with an index hole 7 for determining the start or reference position of soft-formatting. When the index hole 7 is detected by a photo-interrupter 8 (a detector incorporating a light emitting element and light receiving element) of a floppy disk drive, an index hole detection signal U is sent to an information recording and reproducing circuit 10. According to the detection signal U, the information recording and reproducing circuit 10 determines the start or reference position of soft-formatting. Then, a recording signal V is sent to a magnetic head 11, whereby address information is recorded on the floppy disk 6.

When soft-formatting used for the floppy disk 6 is adopted by an optical disk, the following problems are presented. Specifically, the recording density of the optical disk is substantially twenty times to some hundred times that of the floppy disk 6. Therefore, in determining the recording location on the disk, the optical disk requires substantially twenty times to some hundred times the accuracy of that required by the floppy disk. Thus, even when the optical disk is provided with the above-mentioned index hole 7, it is impossible to ensure sufficiently high-accuracy in determining the recording location.

SUMMARY OF THE INVENTION

An object of the present invention is to provide an optical disk having thereon a preformed groove and prerecorded address information, which allows the number of track lines on the optical disk crossed by the spot of a light beam to be correctly counted during track counting.

Another object of the present invention is to provide an optical disk compatible with writing of address information by soft-formatting.

Still another object of the present invention is to provide an optical disk to be used for extensive purposes.

Further object of the present invention is to provide an optical disk drive capable of correctly counting the number of track lines on an optical disk crossed by the spot of a light beam.

Still further object of the present invention is to provide an optical disk drive compatible with writing of information by soft-formatting.

In order to achieve the above object, an optical disk according to the present invention has the following characteristics:

(a) the optical disk has thereon an uninterrupted spiral preformed groove adjoining a track, or a plurality of concentric grooves, each of the grooves being uninterrupted; and (b) the address information of track and sectors is recorded by variations in the preformed groove in a radial direction of the optical disk (e.g. by wobbles and groove-width modulation) at manufacture.

In order to achieve another object as described above, an optical disk according to the present invention has, in addition to characteristic (a), the following characteristics:

(c) the optical disk has thereon index marks providing reference positions for recording of address information on the optical disk that is used in recording of desired information; and (d) the index marks are formed by partial variations in the preformed groove in a radial direction.

In order to achieve still another object as described above, an optical disk according to the present invention has the following characteristic:

(e) the optical disk is provided with a pre-format area having characteristics (a) and (b) and a soft-format area having characteristics (c) and (d).

In order to achieve further object as described above, an optical disk drive according to the present invention is characterized in at least comprising:

(f) photodetector means (e.g. photodiode) for detecting a variation in the intensity of the reflected light from the spot of a light beam projected onto an optical disk and for transmitting a detection signal;

(g) hysteresis comparator means (e.g. hysteresis comparator) having a first slice level used for generating a binary track crossing signal from the detection signal and a second slice level that is greater than the first slice level, the level of the track crossing signal being changed from high to low in accordance with a comparison between the detection signal and the first slice level, the level thereof being changed from low to high in accordance with a comparison between the detection signal and the second slice level.

In order to achieve still further object, an optical disk drive according to the present invention is characterized in at least comprising:

(h) index mark detecting means for detecting an index mark from a desired track line, the index mark being optically readable, and for generating an index mark detection signal;

(i) formatting means for generating formatting data for the address information of the track and sectors in accordance with the index mark detection signal; and (j) recording means for recording the address information in the desired track line in accordance with the formatting data.

In an optical disk having characteristics (a) and (b), since the address information is recorded by variations in shape of the uninterrupted preformed groove adjoining the track, the intensity of the reflected light from the spot of the light beam surely varies when the spot crosses the preformed groove. Namely, this arrangement prevents unnecessary variations in the intensity of the reflected light that occur when the address information is recorded on the track. Thus, the number of track lines crossed by the spot of the light is correctly detected by detecting a variation in the intensity of the reflected light.

In an optical disk having characteristics (a), (c) and (d), like the above case the number of track lines crossed by the spot of the light beam is correctly detected. Moreover, on this optical disk, reference positions, that are needed for writing of address information by soft-formatting, are given by the preformed index marks on the optical disk. Therefore, address information is recorded only in desirable portions when necessary, and which allows the range of use of the optical disk to be broadened.

In an optical disk having characteristic (e) as abovementioned, system file such as operating system and dictionary file can be prerecorded in the pre-format area, while the user can freely record, reproduce or erase desired information in/from the soft-format area. This permits a further increase in the range of use of the optical disk.

In an optical disk having characteristics (f) and (g), even a distorted detection signal can be converted into a binary signal by eliminating the distortion smaller than the difference between the first slice level and the second slice level. This arrangement permits a track crossing signal, that precisely corresponds to the number of track lines crossed by the spot, to be derived from the detection signal.

An optical disk drive having characteristics (h), (i) and (j) is compatible with soft-formatting comprising the following steps: (1) detecting an index mark from a desired track line; (2) generating formatting data; and (3) recording address information.

For a fuller understanding of the nature and advantages of the invention, reference should be made to the ensuing detailed description taken in conjunction with the accompanying drawings.

BRIEF DESCRIPTION OF THE DRAWINGS

FIG. 1 to FIG. 19 illustrate one embodiment of the present invention.

FIG. 1 is an enlarged plan view illustrating a wobbling state of a preformed groove on a magneto-optical disk.

FIG. 2 is a waveform chart illustrating an output signal that is generated when the spot of a light beam crosses the preformed groove shown in FIG. 1.

FIG. 3 is an enlarged plan view illustrating another wobbling state of the preformed groove on the magneto-optical disk.

FIG. 4 is a waveform chart illustrating an output signal that is generated when the spot of the light beam crosses the preformed groove shown in FIG. 3.

FIG. 5 is an enlarged plan view illustrating a part of a preformed groove on the magneto-optical disk that is modulated by a groove-width modulation.

FIG. 6 is a waveform chart illustrating an output signal that is generated when the spot of the light beam crosses the preformed groove shown in FIG. 5.

FIG. 7 is an enlarged plan view illustrating a part of a preformed groove in a data portion in/from which desired information is recorded, reproduced or erased.

FIG. 8 is a waveform chart illustrating an output signal that is generated when the spot of the light beam crosses the preformed groove shown in FIG. 7.

FIG. 9 is a waveform chart illustrating an output signal of an amplifier and a track crossing signal that is obtained by converting the output signal into a binary signal.

FIG. 10 is an explanatory view illustrating the structure of an essential section of a magneto-optical disk drive.

FIG. 11 is a block diagram illustrating the structure of a section of the magneto-optical disk drive that performs track counting.

FIG. 12 is an explanatory view illustrating a format of a magneto-optical disk.

FIG. 13 is a block diagram illustrating a structure which allows a magneto-optical signal and the track crossing signal to be detected separately.

FIG. 14 is a flow chart illustrating the steps of track seeking.

FIG. 15(a) is an enlarged plan view illustrating a state where the spot of the light beam crosses the preformed groove diagonally, and FIG. 15(b) is a waveform chart of an output signal corresponding to FIG. 15(a).

FIG. 16(a) is an enlarged plan view illustrating a state where the spot of the light beam diagonally crosses a preformed groove that wobbles to a reduced degree, FIG. 16(b) is a waveform chart of an output signal corresponding to FIG. 16(a), and FIG. 16(c) is a waveform chart of a track crossing signal that is generated by converting the output signal into a binary signal.

FIG. 17 is an explanatory view illustrating variations in the level of an address information signal due to variations in the wobbling state.

FIG. 18 is a block diagram illustrating the best mode of a reproducing circuit for generating the track crossing signal.

FIG. 19 is a block diagram illustrating a modified example of the reproducing circuit for generating the track crossing signal.

FIG. 20 to FIG. 25 illustrate another embodiment of the present invention.

FIG. 20(a–c) is an explanatory view illustrating index marks formed on a preformed groove on a magneto-optical disk and an output signal corresponding to one of the index marks.

FIG. 21 is a block diagram illustrating a reproducing circuit for generating a track crossing signal and an index mark detection signal.

FIG. 22 is a block diagram illustrating the structure of an essential section of a magneto-optical disk drive capable of soft-formatting the magneto-optical disk.

FIG. 23(a) is an enlarged view illustrating another index marks formed on the preformed groove on the magneto-optical disk, and FIG. 23(b) is a waveform chart of an output signal corresponding to the index marks.

FIG. 24(a) is an explanatory view illustrating a part of the pre-formatted magneto-optical disk, and FIG. 24(b) to FIG. 24(e) illustrate a way of soft-formatting the magneto-optical disk.

FIG. 25 is a flow chart illustrating the steps of soft-formatting.

FIG. 27 is an explanatory view schematically illustrating a preformed groove on an optical disk and address information recorded on a track.

FIG. 28 is a waveform chart illustrating an output signal that is generated when the spot of a light beam crosses the preformed groove shown in FIG. 27.

FIG. 29 is an enlarged plan view illustrating another type of a preformed groove on an optical disk.

FIG. 30 is a waveform chart illustrating an output signal that is generated when the spot of the light beam crosses the preformed groove shown in FIG. 29.

FIG. 31 is a schematic plan view illustrating a floppy disk.

FIG. 32 is an explanatory view illustrating the structure of an essential section of a floppy disk drive.

DESCRIPTION OF THE EMBODIMENTS
[EMBODIMENT 1]

Referring to FIG. 1 to FIG. 19, the following will explain one embodiment of the present invention.

Figure 12:
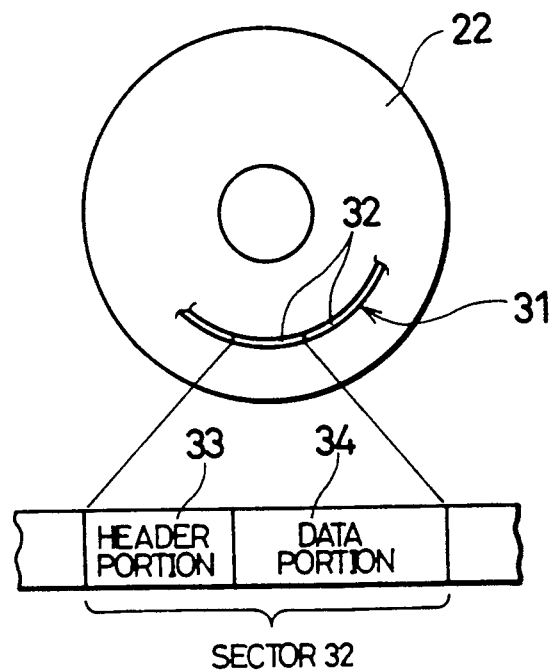

Firstly, the format of a magneto-optical disk 22 (optical disk) will be explained with reference to FIG. 12. The magneto-optical disk 22 is provided with a spiral track 31, and the track 31 is divided into a plurality of sectors 32. The magneto-optical disk 22 may be provided with a plurality of tracks in the form of concentric rings instead of the spiral track 31. In either case, an increasing track address is given to each complete turn of the spiral track or to each track in the case of concentric tracks. Each sector 32 is composed of a header portion 33 and a data portion 34. The address information of the track 31 and sectors 32 is recorded in the header portions 33 by pre-formatting the magneto-optical disk 22 at manufacture. Meanwhile, in the data portions 34, desired information is recorded, reproduced and erased by a magneto-optical disk drive.

Figure 7:
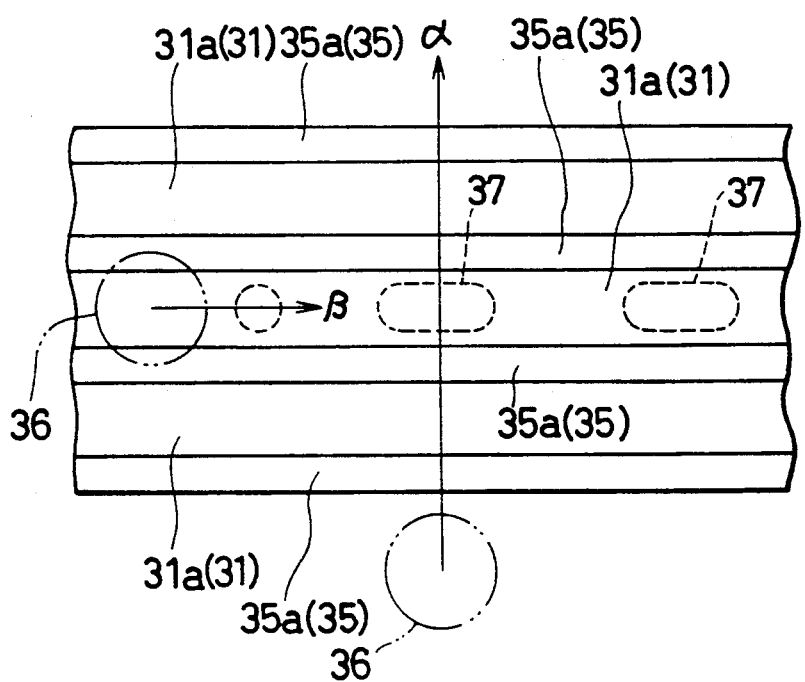

FIG. 7 is an enlarged view illustrating an arbitrary data portion 34 on the track 31 and its periphery. A spiral groove 35 is preformed on the magneto-optical disk 22. Here, one complete turn of the spiral track 31 and spiral preformed groove 35 are referred to as a track line 31a and preformed groove line 35a, respectively. Namely, as illustrated in FIG. 7, a plurality of the track lines 31a and preformed groove lines 35a are alternately formed on the magneto-optical disk 22. In other words, the track line 31a is a portion situated between adjacent preformed groove lines 35a.

Figure 10:
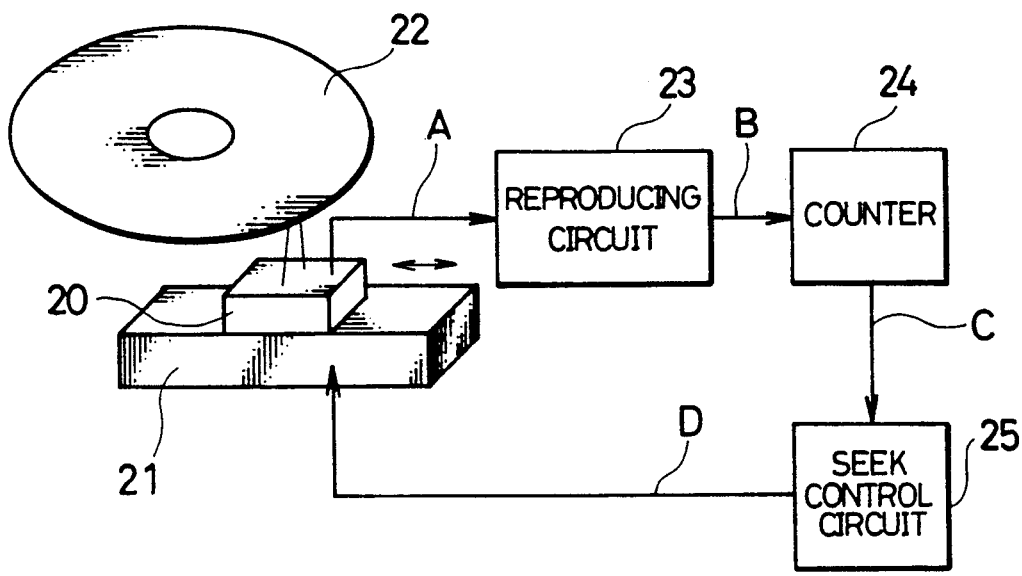

As illustrated in FIG. 10, an optical head 20 is moved in a radial direction of the magneto-optical disk 22 by a linear motor 21 (optical head moving means). A beam of laser light emitted from the optical head 20 is projected as a spot onto the magneto-optical disk 22. Reflected light from the magneto-optical disk 22 is converted into an electric signal A by a photodiode 26 (see FIG. 11) of the optical head 20. The electric signal A is then sent to a reproducing circuit 23.

During track seeking, i.e. when the optical head 20 is moved in a radial direction of the magneto-optical disk 22 towards a desired track line 31a, the reproducing circuit 23 transmits a digital track crossing signal B, to be described later, to a counter 24 (counting means). The number of track lines 31a crossed by the spot of the light beam (hereinafter called "track crossing number") is counted in the counter 24 (this operation, hereinafter referred to as "track counting").

Enumerated data C output by the counter 24 is sent to a seek control circuit 25. In the seek control circuit 25, the track address of a track line 31a over which the spot of the light beam is passing is identified i accordance with a track crossing number given by the enumerated data C. The movement of the optical head 20 in a radial direction is controlled by an optical head control signal D that is sent to the linear motor 21 from the seek control circuit 25. A target track address is thus found.

Figure 11:
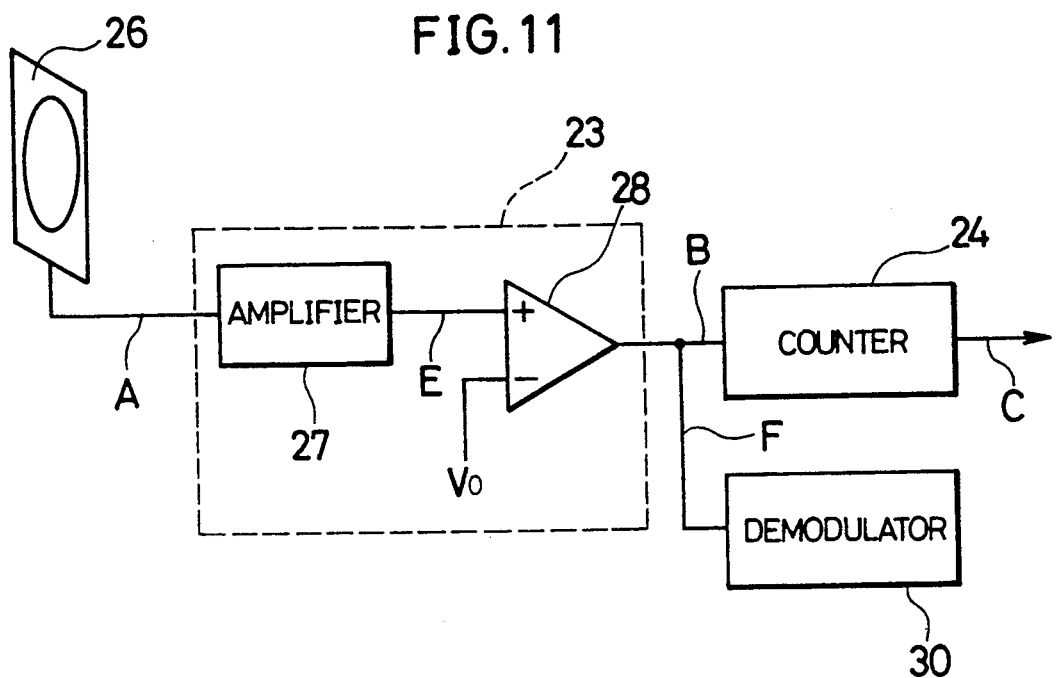

FIG. 11 illustrates the structure of a section of the magneto-optical disk drive which performs track counting.

The electric signal A output by the photodiode 26 is amplified by an amplifier 27 in the reproducing circuit 23. An output signal E of the amplifier 27 is input to the positive input terminal of a comparator 28, while a comparison voltage $V_0$ is input to the negative input terminal thereof.

The track crossing signal B, that is a binary signal generated by the comparator 28 when the spot of the light beam crosses the track lines 31a, is sent to the counter 24. Meanwhile, an address information signal F, that is a binary signal generated by the comparator 28 when the spot of the light beam is moved along a track line 31a, is transmitted to a demodulator 30. The address information is, for example, "biphase-mark" modulated before it is recorded on the magneto-optical disk 22. Accordingly, in the demodulator 30, the address information is demodulated from the address information signal F.

When recording information in a data portion 34, the spot of a light beam 36 is relatively moved in the direction of arrow $\beta$ along a track line 31a so as to record a magneto-optical mark 37 (hereinafter referred to as MO mark) by means of magneto-optical recording. Although not shown in FIG. 10, the magneto-optical disk drive is provided with a magnetic field generating section in addition to the optical head 20. During reproduction or erasing, similarly, the spot of the light beam 36 is relatively moved in the direction of arrow $\beta$ to reproduce or erase the MO mark 37.

Figure 8:
Figure 9:
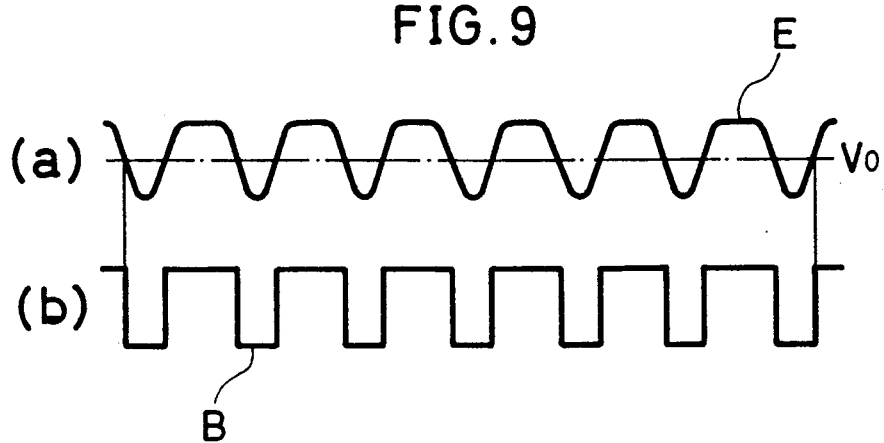

During track seeking, the spot of the light beam 36 is moved in the direction of arrow $\alpha$ while crossing successive track lines 31. As illustrated in FIG. 8, the level of the output signal E of the amplifier 27 (see FIG. 11) falls every time the spot of the light beam 36 crosses a preformed groove line 35a.

So, during track seeking, as illustrated in FIG. 9(a), the output signal E of the amplifier 27 is sliced by the comparison voltage $V_0$ in the comparator 28 so as to generate the above-mentioned track crossing signal B. The level of the track crossing signal B falls and rises once every time the spot of the light beam 36 crosses a track line 31a.

The track crossing signal B is input to the counter 24. Then, a target track address is accurately found by control operation of the seek control circuit 25 in accordance with the enumerated data corresponding to the track crossing number according to the spot of the light beam 36.

Here, as the MO mark 37 is recorded by means of magneto-optical recording, a magneto-optical signal of the MO mark 37 is not included in the track crossing signal B. This will be explained more precisely with reference to FIG. 13.

Figure 13:
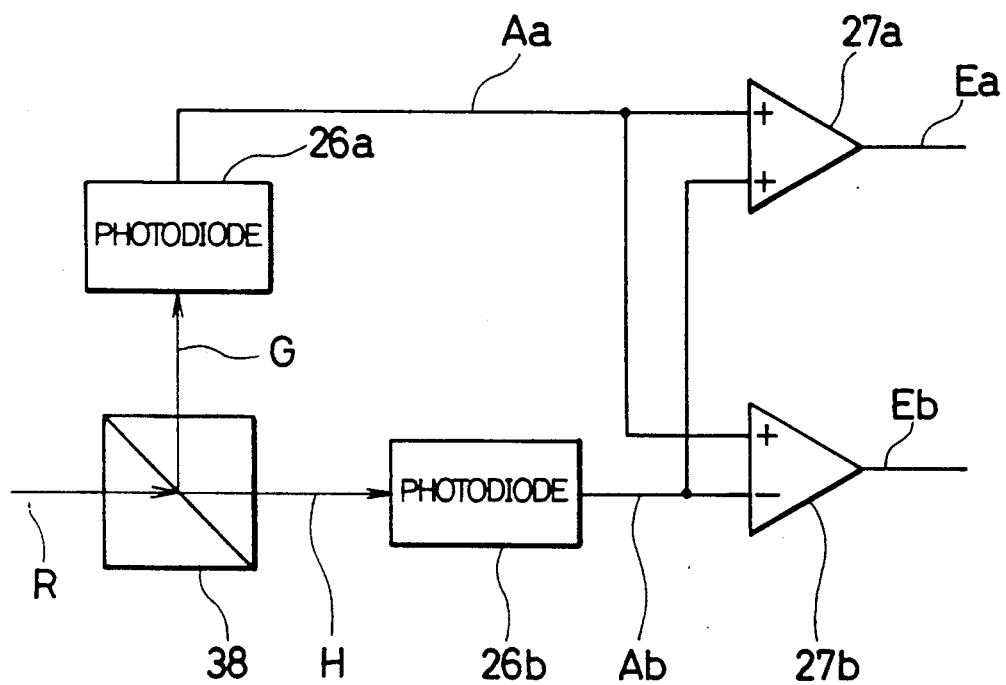

FIG. 13 illustrates in detail the peripherals of the photodiode 26 shown in FIG. 11. By means of a polarized-beam splitter 38, reflected light R from the magneto-optical disk 22 is split into detection light G and detection light H whose polarization planes are different from each other. The detection light G and detection light H are converted into electric signals Aa and Ab by photodiodes 26a and 26b, respectively.

Both of the electric signals Aa and Ab are input to an adding amplifier 27a and a subtracting amplifier 27b. In this arrangement, a signal corresponding to a preformed groove line 35a and an address mark 40, to be described later, is included in an output signal Ea of the adding amplifier 27a, but a magneto-optical signal corresponding to the MO mark 37 is not included therein. On the other hand, an output signal Eb of the subtracting amplifier 27b includes the magneto-optical signal of the mark 37, but does not include the signal corresponding to the preformed groove line 35a and the address mark 40.

The output signal Ea of the adding amplifier 27a is thus used as both the track crossing signal B and address information signal F, while the output signal Eb of the subtracting amplifier 27b is used as magneto-optically recorded information signal.

Figure 1:
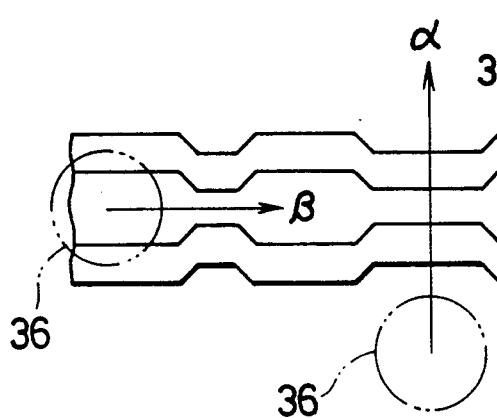

FIG. 1 is an enlarged view of the periphery of an arbitrary header portion 33 on the track 31. Similar to the data portion 34, a track line 31a is formed between two preformed groove lines 35a. However, in the header portion 33, the preformed groove lines 35a on both sides of the track line 31a are respectively undulated by a width of $\Delta W$ in opposite directions, i.e. outwards and inwards of the magneto-optical disk 22 (undulation of the preformed groove lines 35a and track lines 31a is called wobble). In other words, the wobbles of the preformed groove lines 35a serve the address marks 40 providing address information.

The address information is, for example, biphase-mark modulated before it is recorded. In the header portions 33 and data portions 34, the preformed groove lines 35a have no interruptions in a circular direction. More specifically, when the track 31 and preformed groove 35 are arranged in the form of a spiral, a number of preformed groove lines 35a constitute one uninterrupted preformed groove. Meanwhile, when the track 31 and preformed groove 35 are arranged in the form of concentric rings, each preformed groove line 35a forms one uninterrupted ring.

During recording, reproduction or erasing by a magneto-optical method, the spot of the light beam 36 is relatively moved in the direction of arrow $\beta$ along a found track line 31a so as to read out address information from the marks 40 in the header portions 33. Then, desired information is recorded in, reproduced or erased from a data portion 34 of a specified address.

Figure 2:
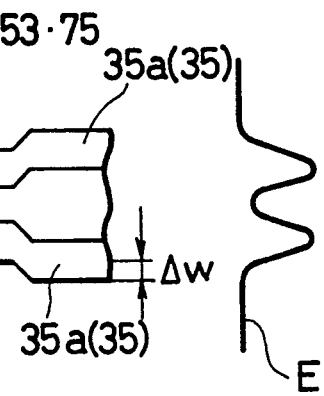

During track seeking, the spot of the light beam 36 is moved in the direction of arrow $\alpha$ while crossing the track lines 31a. As illustrated in FIG. 2, the level of the output signal E of the amplifier 27 falls when the spot of the light beam 36 crosses a preformed groove line 35a. This causes the level of the track crossing signal B that is a binary signal of the output signal E to fall and rise once every time the spot of the light beam 36 crosses a track line 31a.

As described above, since the address marks 40 are formed as a part of the preformed groove 35, the address marks 40 are present only on the preformed groove 35, i.e. they do not exist on the track 31. Besides, since the preformed groove 35 has no interruptions in a circular direction, the level of the track crossing signal B is certainly falls and rises when the spot of the light beam 36 crosses the track 31. This enables the counter 24 to accurately count the track crossing number. As a result, a target track address, i.e. track line 31a is correctly found.

Figure 3:
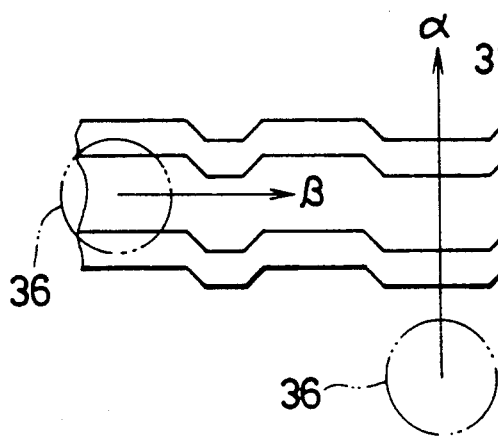
Figure 5:
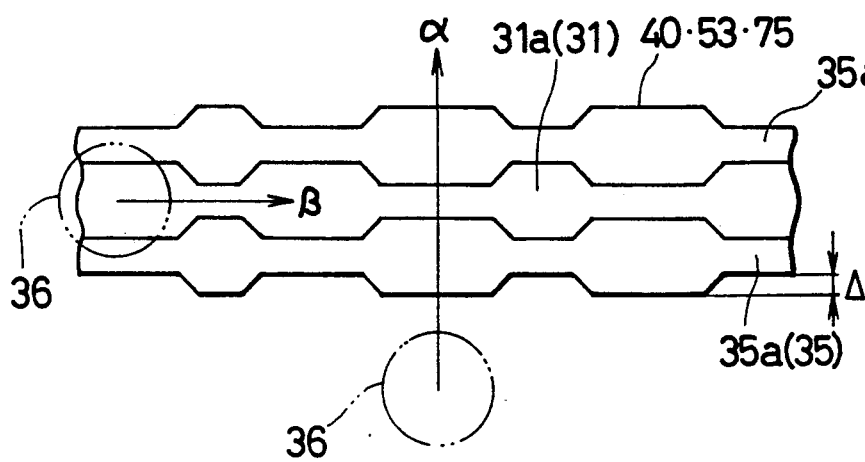

FIG. 3 illustrates another example of address marks 40 in the header portions 33. Here, the preformed groove lines 35a on each side of the track line 31a are wobbled by a width of $\Delta W$ in the same radial direction (either inwards or outwards). Namely, the wobbling states of the preformed groove lines 35a are equal to each other. FIG. 5 shows still another example of address marks 40, where the widths of the preformed groove lines 35a on each side of the track line 31a are partially varied by a width of $\Delta W$ outwardly and inwardly in the same manner. The variations in the widths correspond to modulation data generated from address information by, for example, biphase-mark modulation.

A method for partially varying the widths of the preformed groove lines 35a, that is employed to record address information, is called "groove-width modulation".

Figure 4:
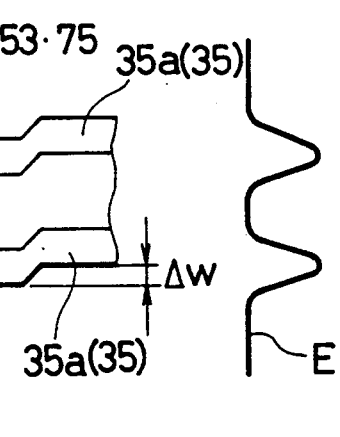
Figure 6:

In the above-mentioned modified examples as well, the address marks 40 are present only on the preformed groove lines 35a and the preformed groove lines 35 have no interruptions in a circular direction. Therefore, as illustrated in FIG. 4 and FIG. 6, the level of the output signal E of the amplifier 27 falls and rises once every time the spot of the light beam 36 crosses a preformed groove line 35a. The track crossing number is thus accurately counted in accordance with the track crossing signal B that is a binary signal of the output signal E.

Figure 14:
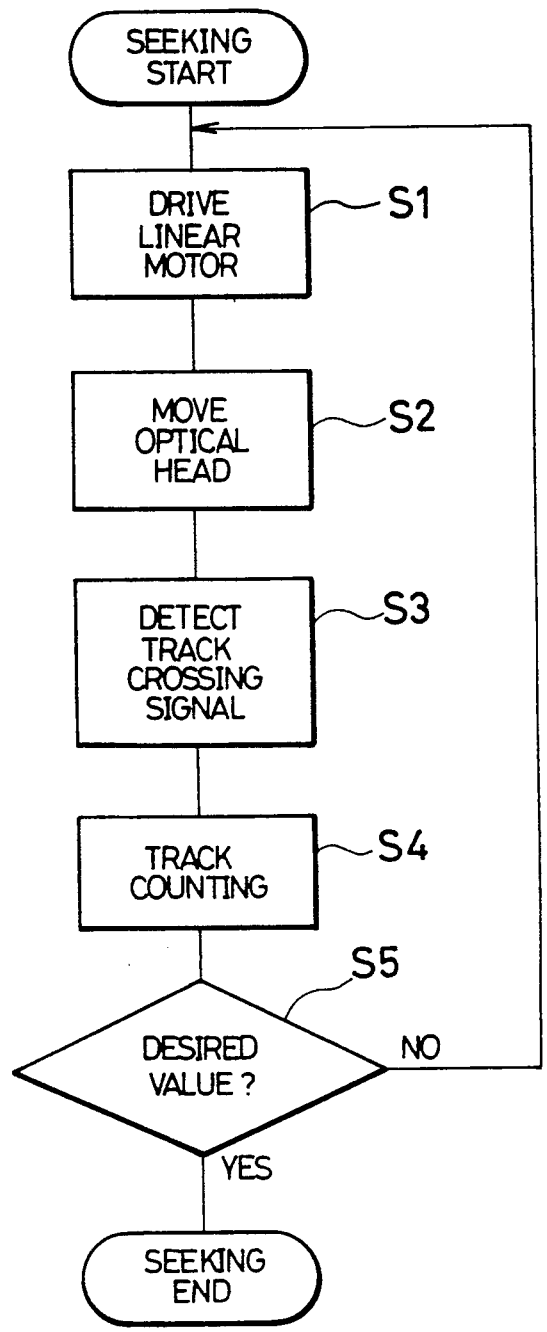

FIG. 14 is a flow chart of track seeking operation.

When the optical head 20 is instructed to access to a target location on the magneto-optical disk 22, firstly track seeking operation is commenced. Namely, the linear motor 21 is driven (S1) and then the optical head 20 is moved to a target track line 31a (S2).

Next, the track crossing signal B is generated (S3), and the track crossing number is counted by the counter 24 (S4). Then, the seek control circuit 25 judges whether or not the track crossing number counted by the counter 24 reaches a desired value (S5). If the track crossing number is below the desired value, the operation is returned to S1 and the linear motor 21 is driven again.

Meanwhile, when the track crossing number reaches the desired value, the track seeking operation is completed and sector searching operation is started.

In the explanation with reference to FIG. 1 to FIG. 9, it is assumed, for the purpose of simplifying the explanation, that the spot of the light beam 36 crosses the track lines 31a at substantially right angles during track seeking. In practice, however, since the magneto-optical disk 22 spins during track seeking, the spot of the light beam 36 diagonally crosses the track lines 31a. In this case, even when the spot of the light beam 36 crosses the data portion 34 diagonally, the track crossing signal B is not distorted.

However, when the spot of the light beam 36 crosses the header portion 33 diagonally as illustrated in FIG. 15(a), the output signal E of the amplifier 27 may be distorted as shown in FIG. 15(b) due to the relationship between a gradient angle 8 at which the spot of the light beam 36 crosses the track line 31a and the variation range ΔW with respect to the address marks 40. Namely, the smaller the gradient angle 9 or the greater the variation range ΔW with respect to the address mark 40, the more easily the output signal E of the amplifier 27 is distorted. When the output signal E is distorted, the track crossing signal B is also distorted, and which lowers the accuracy of track counting. To achieve accurate track counting, the variation range ΔW needs to be as small as possible as shown in FIG. 16(a).

Figure 17:
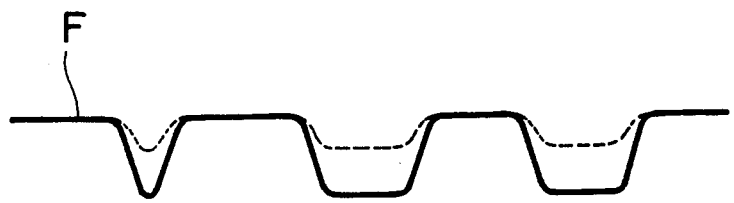

However, when the variation range ΔW becomes small, the address information signal F is attenuated as illustrated by the dotted line in FIG. 17, and which causes a lowering of the signal-to-noise ratio (S/N ratio) of the address information signal F (see Table 1).

Hence, when determining the variation range ΔW, it is necessary to consider the balance between the S/N ratio of the address information signal F derived from the mark 40 and the accuracy of track counting.

TABLE 1

| Variation Range ΔW | S/N Ratio of Address Information Signal | Accuracy of Track Counting |
|---|---|---|
| great | high | low |
| small | low | high |

Figure 18:
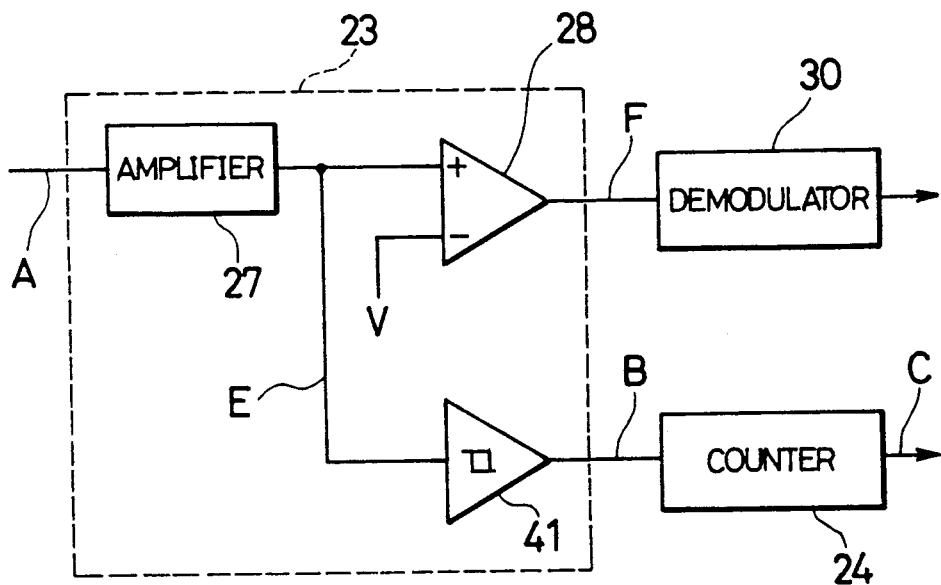

If the arrangement in FIG. 18 is employed instead of the arrangement in FIG. 11, the accuracy of track counting improves. In this arrangement, a hysteresis comparator 41 is disposed in parallel to the comparator 28, and an output signal of the hysteresis comparator 41 is input to the counter 24 as the track crossing signal B. Here, the hysteresis comparator 41 is set such that a threshold for inverting the output signal from a low level to a high level is Δy higher than a threshold for inverting the output signal from a high level to a low level.

FIG. 16(b) and FIG. 16(c) respectively illustrate the waveforms of the output signal E and track crossing signal B of the circuit shown in FIG. 18. Here, the variation range ΔW of the address marks 40 is smaller than that shown in FIG. 15, and therefore the output signal E is distorted to a smaller degree. Moreover, the hysteresis level Δy that is set at the above threshold level to convert the output signal E into a binary signal can prevent the track crossing signal B from being distorted. For instance, a distortion Z in the waveform of the output signal E does not affect the track crossing signal B. The following relationship needs to be satisfied:

$$X_t > \Delta y > X_s$$

where $X_t$ denotes the amplitude of the output signal E, $X_s$ the amount of amplitude distortion of the output signal E, and $\Delta y$ the hysteresis level.

FIG. 15 and FIG. 16 illustrate an example where the spot of the light beam 36 orthogonally crosses header portions 33 having address marks 40 in the form of wobbles as shown in FIG. 3. The same is said to other cases where the spot of the light beam 36 orthogonally crosses header portions 33 having address marks 40 shown FIG. 1 or FIG. 5.

Figure 19:
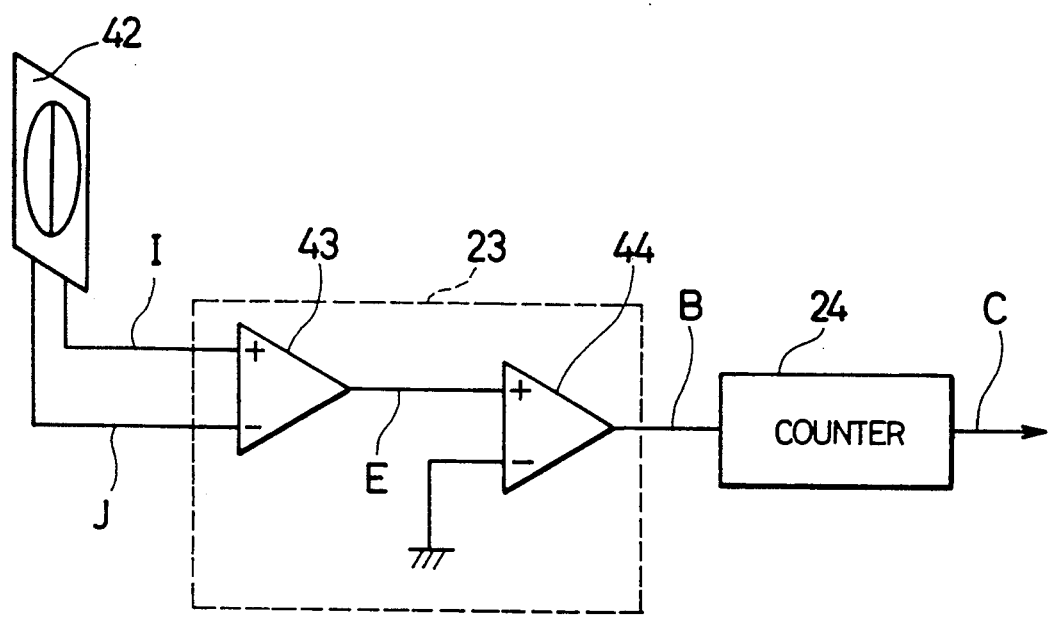

As for the track counting section in this embodiment, the structure shown in FIG. 19 may be employed instead of the structure illustrated in FIG. 11.

Namely, in this case, a photodiode 42 which is divided into two light receiving sections is employed instead of the photodiode 26 shown in FIG. 11. Output signals I and J from the light receiving sections of the photodiode 42 are input to the positive input terminal and negative input terminal of a differential amplifier 43, respectively. An output signal of the differential amplifier 43 is a well known tracing error signal used for tracking servo of the spot of the light beam 36. The output signal E is input to the positive input terminal of a comparator 44, while the negative input terminal thereof is grounded. An output signal of the comparator 44 is sent to the counter 24 as the track crossing signal B and used for track counting.

[EMBODIMENT 2]

Referring to FIG. 20 to FIG. 25, the following will explain another embodiment of the present invention.

In Embodiment 1, address information is prerecorded in the header portion 33 of each sector 32 by, for example, wobbling a preformed groove. This embodiment discloses a method in which the address information is magneto-optically written in the header portions 33 on a magneto-optical disk 52 in accordance with preformed index marks 53 after the disk 52 is manufactured (the method, hereinafter referred to as soft-formatting).

FIG. 20(a) and FIG. 20(b) illustrate the magneto-optical disk 52 suitable for soft-formatting. The magneto-optical disk 52 is provided with a spiral track 31 and a spiral preformed groove 35 (similar to Embodiment 1, a plurality of tracks and preformed grooves may be arranged in the form of concentric rings). To form the index marks 53, for example, preformed groove lines 35a on each side of a track line 31a are partially undulated in the same direction. For instance, one index mark 53 is formed in a certain location of each track line 31a. The length of each index mark 53 along the track line 31a is about 1 μm to 100 μm (in this case, the wavelength of laser light is 800 nm and the numerical aperture (NA) of an objective lens is 0.5).

In a magneto-optical disk drive illustrated in FIG. 21 and FIG. 22, a semiconductor laser 54 of an optical head 20 shown in FIG. 22 projects a beam of laser light onto a specified track line 31a (FIG. 20) to detect the index mark 53. A reflected beam from the magneto-optical disk 52 is received by a photodiode 26 shown in FIG. 21. An electric signal A from the photodiode 26 is sent to a reproducing circuit 23.

In the reproducing circuit 23, the electric signal A is amplified by an amplifier 27, and an output signal E of the amplifier 27 is input to the positive input terminal of a comparator 28. Meanwhile, according to a comparison voltage $V_0$ input to the negative input terminal of the comparator 28, the output signal E of the amplifier 27 is converted into a binary signal. As illustrated in FIG. 20(c), when a beam of laser light is projected in front of and behind the index mark 53, the level of the output signal E becomes high, while when the beam of laser light is projected onto the index mark 53, it becomes low. Thus, by using the comparison voltage $V_0$ as a slice level, a signal corresponding to the index mark 53, contained in the output signal E, is detected.

Meanwhile, during track seeking, the output signal of the comparator 28 is sent as a track crossing signal B to a counter 24 where the track crossing number is counted in the same manner as in the above embodiment. After the laser light beam is directed to the specified track line 31a, the output signal of the comparator 28 is sent as an index mark signal K to an index mark detecting circuit 55. The index mark detecting circuit 55 detects the index mark 53 and then transmits an index mark detection signal L. The index mark detection signal L is sent to a formatting circuit 56, whereby the start or reference position of soft-formatting is detected and formatting data is generated. In accordance with the formatting data, a formatting data signal M is sent to the semiconductor laser 54 and then the soft-formatting of the magneto-optical disk 52 is executed.

In FIG. 20, one index mark 53 is formed on each track line 31 by one undulation. However, as illustrated in FIG. 23(a), each index mark 53 may be formed by a plurality of undulations (i.e. by wobbles). Also, in this case, a signal (see FIG. 23(b)) read from the index mark 53 is converted into a binary signal by the comparator 28 and the index mark 53 is detected by the index mark detecting circuit 55. Thus, when the index mark 53 is formed by a series of wobbles, the number of errors in the detection of the index mark 53 is reduced compared to the case using the index marks shown in FIG. 20.

Moreover, similar to the address marks 40 shown in FIG. 1 according to Embodiment 1, the index marks 53 may be formed by undulating the preformed groove lines 35a on each side of the track line 31a in opposite directions. The index marks 53 may also be formed by groove-width modulation of the preformed groove lines 35a like the address marks 40 shown in FIG. 5.

Next, two types of formats of Nth track line 31a on the magneto-optical disk 52 are shown in FIG. 24. FIG. 24(a) illustrates the pre-format described in Embodiment 1. More specifically, the address information is recorded in the header portion 33 of each sector 32 by means of the address mark 40 at the manufacture of the magneto-optical disk 52. Meanwhile, FIG. 24(b) relates to soft-formatting, in which one index mark 53 is formed in a certain location (i.e. the lead) of each track line 31a at the manufacture of the magneto-optical disk 52.

When recording information on the magneto-optical disk 52 by means of soft-formatting, firstly the address information of the track 31 and sectors 32 is written thereon. At this time, as described above, if the index mark signal K, that is transmitted by the reproducing circuit 23 in accordance with the reflected beam from the magneto-optical disk 52, includes a signal derived from an index mark 53, the index mark detection signal L is transmitted by the index mark detecting circuit 55 as shown in FIG. 24(d).

Consequently, as illustrated in FIG. 24(e), the start positions of soft-formatting are determined in accordance with the respective index mark detection signals L. Then, according to the formatting data signal M, the semiconductor laser 54 emits the laser light beam. This allows the address information of the track lines 31a and sectors 32 to be written in the respective header portions 33 as illustrated in FIG. 24(c). FIG. 24 illustrates an example where five sectors 32 constitute one track line 31a.

Since the address information is recorded by soft-formatting, the addresses of the track 31 and sectors 32 are identified by reproducing the address information in the header portions 33, and desired information is then recorded on, reproduced or erased from the respective data portions 34. In the above example, one index mark 53 is formed in each track line 31a, however a plurality of index marks 53 may be formed in one track line 31a so as to improve the accuracy of soft-formatting.

Figure 25:
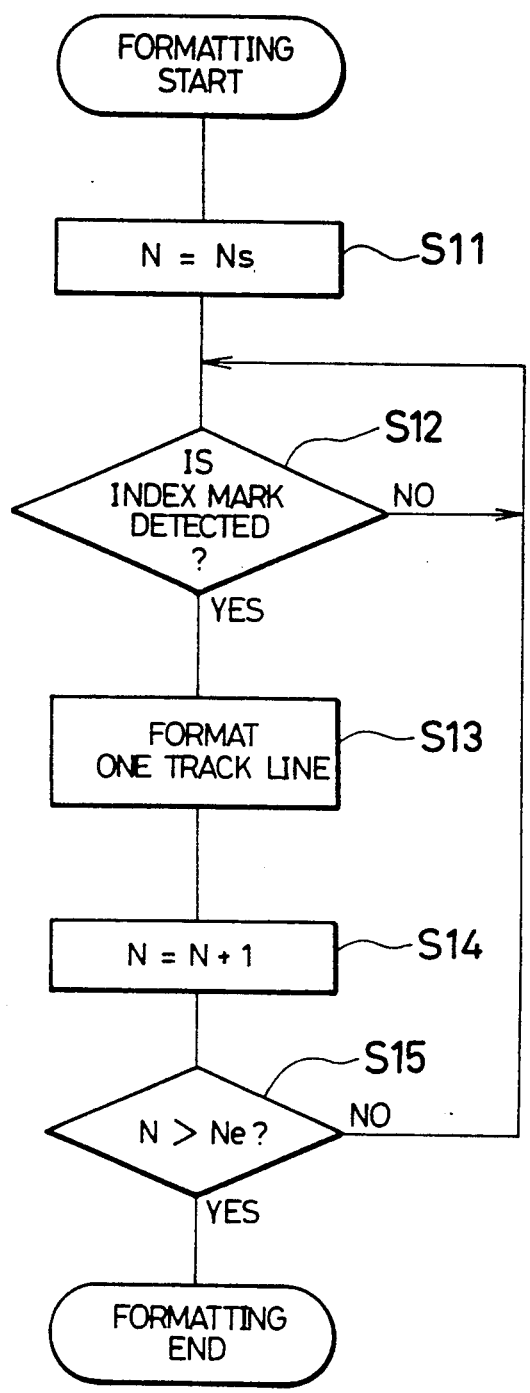

FIG. 25 is a flow chart of soft-formatting.

When soft-formatting of $N_s$th track line 31a to $N_e$th track line 31a is commenced, firstly the start track number $N_s$ is substituted for track number N, whereby the start position of soft-formatting is set (S11). Secondly, the $N_s$th track line 31a is found and the index mark 53 on this track line 31a is detected (S12). As the index mark 53 on the $N_s$th track line 31a is detected, soft-formatting of one track line, i.e. the $N_s$th track line 31a is carried out (S13).

Then "1" is added to the track number, and it is judged whether the resulting track number is greater than the end track number $N_e$ (S14). When the resulting track number is greater than $N_e$, soft-formatting is completed. On the other hand, when it is smaller than $N_e$, the operation is returned to S12 and the same process is carried out.

Similar to Embodiment 1, the magneto-optical disk drive of this embodiment comprises the counter 24 for counting the track crossing number during track seeking, a seek control circuit 25 (see FIG. 10) for controlling track seeking operation in accordance with the numerated data of the counter 24 and other devices. The descriptions of the devices are omitted here. Moreover, the magneto-optical disk 52 is provided with preformed groove lines 35a, each of which having no interruptions in a circular direction like Embodiment 1.

Accordingly, during track seeking, i.e. when the optical head 20 is moved in a radial direction of the magneto-optical disk 52, the spot of the light beam 36 crosses one preformed groove line 35a every time it crosses one track line 31a. Further, since the index marks 53 are formed by, for example, wobbling the preformed groove lines 35a, the level of the track crossing signal B falls and rises only on the preformed groove lines 35a. This achieves an accurate counting of the track crossing number like Embodiment 1.

As explained in Embodiment 1 with reference to FIG. 13, a magneto-optical signal, that is derived from the address information magneto-optically recorded in the header portion 33 and desired information magneto-optically recorded in the data portion 34, is detected separately from the track crossing signal B that is derived from the index mark 53.

Further more, when the laser light beam diagonally crosses the index mark 53 (see FIG. 20, 23, 1 or 5) during track seeking, the output signal E of the amplifier 27 is distorted, and which may distort the track crossing signal B. This is due to the same reason as that explained in Embodiment 1 for the distortion of the track crossing signal B that occurs when the spot of the light beam crosses the address mark 40 diagonally.

Like Embodiment 1, the distortion of the track crossing signal B is restrained by reducing the variation range ΔW of the index mark 53. In this case, however, the S/N ratio of signals derived from the index marks 53 is lowered. Therefore, it is necessary to consider the balance between the the variation range ΔW and the S/N ratio when determining the variation range ΔW. Also, it is desirable to dispose a hysteresis comparator 41 (see FIG. 18) in one stage before the counter 24 for counting the track crossing number in the same manner as in Embodiment 1.

[EMBODIMENT 3]

The following will explain still another embodiment of the present invention.

Figure 26:
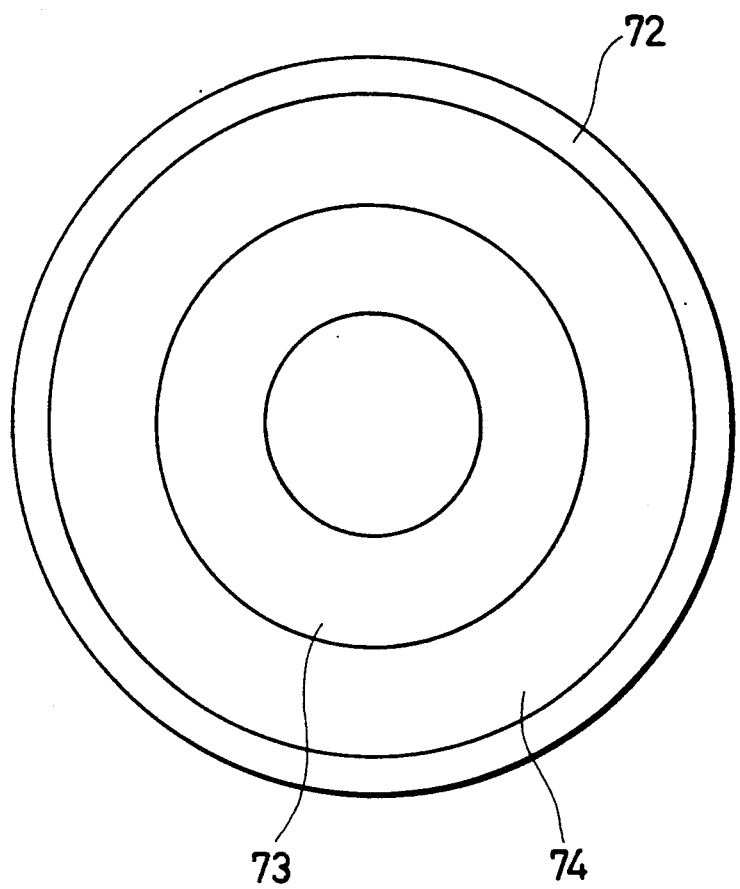
FIG. 26 is an explanatory view schematically illustrating the structure of a magneto-optical disk disclosed in still another embodiment of the present invention.
Figure 27:
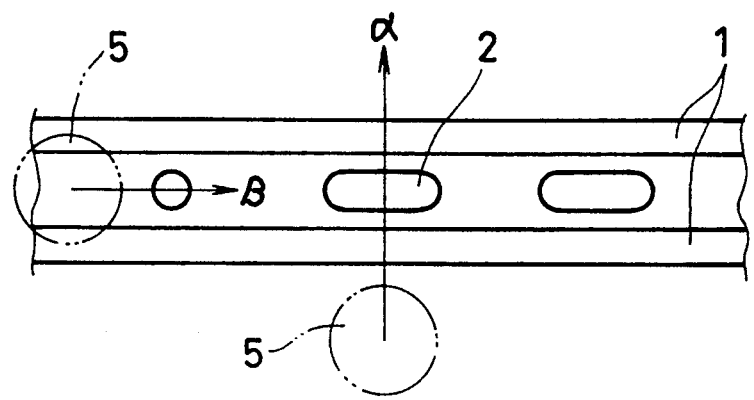
FIG. 27 to FIG. 32 illustrate conventional examples.
Figure 28:
Figure 29:
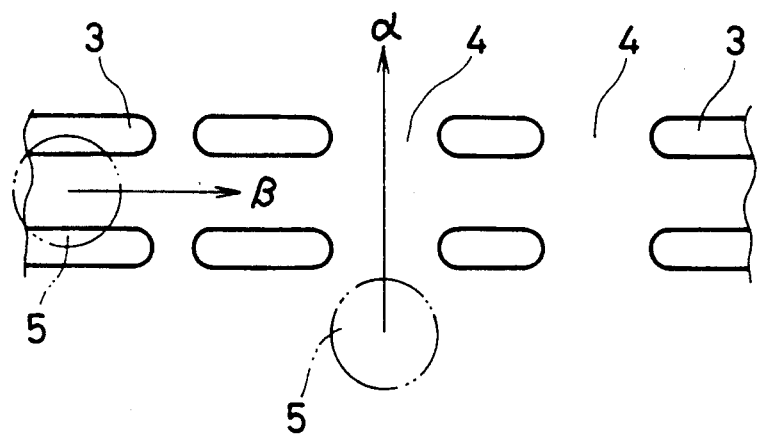
Figure 30:
Figure 31:
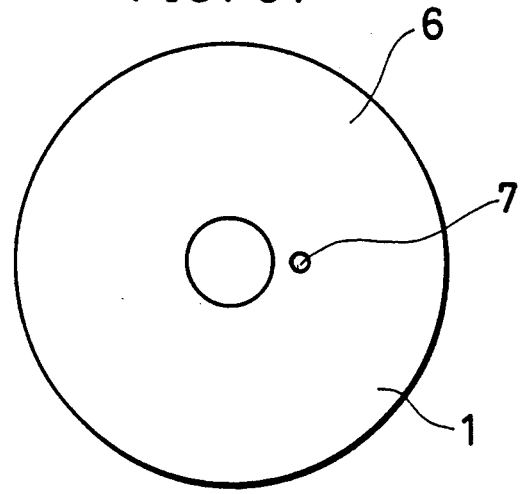
Figure 32:
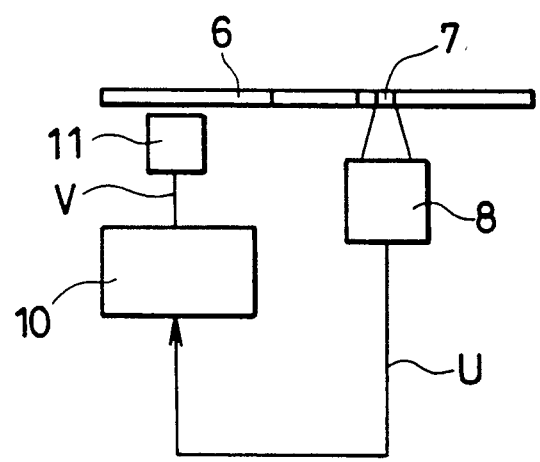

As illustrated in FIG. 26, the recording area on a magneto-optical disk 72 is divided into an inner first area 73 (pre-format area) and an outer second area 74 (soft-format area). Similar to Embodiments 1 and 2 above described, track lines 31a are preformed between adjacent preformed groove lines 35a in the first area 73 and second area 74.

In each sector 32 in the first area 73, address information in the form of an address mark 40 is prerecorded in its header portion 33, while information in the form of an information mark 75 is prerecorded in its data portion 34 (see FIG. 1, 3, 5 or 7). Both of the address mark 40 and the information mark 75 are formed on the magneto-optical disk 72 by wobbling the preformed groove line 35a or by a groove-width modulation at manufacture.

Meanwhile, in each sector 32 in the second area 74, similar to Embodiment 2, one index mark 53 is preformed in a certain location of each track line 31a by undulating or wobbling the preformed groove line 35a or by the groove-width modulation (see FIG. 24(b)). The address information is recorded in the respective header portions 33 in the second area 74 in accordance with detected index marks 53, and then desired information is recorded in, reproduced or erased from the respective data portions 34.

With an optical disk drive that is compatible with optical disks of read only type and write once type, and rewritable optical disks including the magneto-optical disk 72, it is necessary to write a description of the disk type, i.e. magneto-optical disk, and recording conditions in the first area 73 on the magneto-optical disk 72. Accordingly, when the optical disk drive reproduces the information from the first area 73, the disk type is identified as magneto-optical disk 72. This allows the optical disk drive to set recording conditions with respect to the second area 74, and therefore desired information can be recorded in, reproduced or erased from the second area 74 after the magneto-optical disk 72 is soft-formatted.

In the case of using the magneto-optical disk 72 as a recording medium for use with a computer system, system files such as OS (operating system) needs to be recorded in the first area 73 by means of pre-formatting. Particularly, in the case of a word processor, information which does not need to be erased or rewritten, such as dictionary file is recorded in the first area 73, while information which needs to be erased or rewritten such as user file is recorded in the second area 74. The use of the magneto-optical disk 72 is thus broaden by dividing the disk 72 into the first area 73 and the second area 74.

Like Embodiments 1 and 2 above described, the optical disk drive in this embodiment also employs a counter 24 for counting the track crossing number during track seeking and a seek control circuit 25. Each preformed groove line 35a in the first area 73 and the second area 74 has no interruptions in a circular direction. Further, the address marks 40 (in the header portions 33) and information marks 75 (in the data portions 34) in the first area 73, and index marks 53 in the second area 74 are formed by wobbling the preformed groove lines 35a or by other types of modulation. Furthermore, since the level of the track crossing signal B only falls and rises on the preformed groove lines 35a, the track crossing number is accurately counted in the first area 73 and the second area 74.

In Embodiment 3, the second area 74 is specified as soft-format area. However, the address information may be prerecorded in the header portions 33 in this area by, for example, wobbles, and desired information may be magneto-optically recorded in, reproduced or erased from the data portions 34 therein.

In Embodiment 3, the recording area is divided into the first area 73 and second area 74, however, it may be divided into a greater number of areas.

In the aforesaid embodiments, magneto-optical disks are used, however the present invention is also applicable to other types of rewritable optical disks such as optical disk of phase transition type and of write once type.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disk drive comprising:
   optical head means for projecting a light beam as a spot onto an optical disk;
   photodetector means for detecting a variation in intensity of reflected light from the spot of the light beam and for transmitting a detection signal;
   index mark detecting means for detecting an index mark and for generating an index mark detection signal, one index mark being formed on each track line on the optical disk, the index mark being optically readable, one track line representing one complete turn of a circular track on the optical disk;
   optical head control mean for moving the spot of the light beam to a desired track line in accordance with the photodetection signal;
   formatting means for generating formatting data of address information of track and sectors in accordance with the index mark detection signal, the address information being necessary for recording, reproduction and erasing of desired information;
   recording means for recording the address information on the desired track line in accordance with the formatting data;
   hysteresis comparator means for generating a binary signal by comparing the detection signal with a first slice level and with a second slice level when the spot of the light beam crosses the track line, the second slice level being higher than the first slice level; and
   counting means for receiving the binary signal from the hysteresis comparator means and for counting the number of track lines crossed by the spot of the light beam,
   wherein a level of the binary signal turns from high to low in accordance with the comparison between the detection signal and the first slice level, while it turns from low to high in accordance with the comparison between the detection signal and the second slice level.

2. The optical disk drive as defined in claim 1, wherein the optical disk drive satisfies the equation, $$Xt > \Delta y > Xs$$

where Xt denotes an amplitude of the detection signal, Xs denotes an amount of amplitude distortion of the detection signal, and $\Delta y$ denotes a difference between the second slice level and the first slice level.

3. An optical disk drive comprising:
   optical head means for projecting a light beam as a spot onto an optical disk;
   photodetector means for detecting a variation in intensity of reflected light from the spot of the light beam and for transmitting a detection signal;
   index mark detecting means for detecting an index mark and for generating an index mark detection signal, one index mark being formed on each track line on the optical disk, the index mark being optically readable, one track line representing one complete turn of a circular track on the optical disk;
   optical head control means for moving the spot of the light beam to a desired track line in accordance with the photodetection signal;
   formatting means for generating formatting data of address information of track and sectors in accordance with the index mark detection signal, the address information being necessary for recording, reproduction and erasing of desired information; and
   recording means for recording the address information on the desired track line in accordance with the formatting data;
   wherein the optical head control means comprises:
   counting means for counting the number of track lines crossed by the spot of the light beam; optical head driving means for moving the optical head means in a radial direction of the optical disk;
   comparator means for comparing numerated data of the counting means with a desired value; and
   driving signal generating means for supplying a driving signal to the optical head driving means until the numerated data coincides with the desired value.

4. An optical disk drive comprising:
   optical head means for projecting a light beam as a spot onto an optical disk;
   photodetector means for detecting a variation in intensity of reflected light from the spot of the light beam and for transmitting a detection signal;
   index mark detecting means for detecting an index mark and for generating an index mark detection signal, one index mark being formed on each track line on the optical disk, the index mark being optically readable, one track line representing one complete turn of a circular track on the optical disk;
   optical head control means for moving the spot of the light beam to a desired track line in accordance with the photodetection signal;
   formatting means for generating formatting data of address information of track and sectors in accordance with the index mark detection signal, the address information being necessary for recording, reproduction and erasing of desired information; and
   recording means for recording the address information on the desired track line in accordance with the formatting data;
   wherein the recording means includes magnetic head means for applying a magnetic field onto the optical disk during magneto-optical recording.

5. An optical disk drive comprising:
   optical head means for projecting a light beam as a spot onto an optical disk;
   photodetector means for detecting a variation in intensity of reflected light from the spot of the light beam and for transmitting a detection signal;
   index mark detecting means for detecting an index mark and for generating an index mark detection signal, one index mark being formed on each track line on the optical disk, the index mark being optically readable, one track line representing one complete turn of a circular track on the optical disk;
   optical head control means for moving the spot of the light beam to a desired track line in accordance with the photodetection signal;
   formatting means for generating formatting data of address information of track and sectors in accordance with the index mark detection signal, the address information being necessary for recording, reproduction and erasing of desired information;

recording means for recording the address information on the desired track line in accordance with the formatting data;

comparator means which generates a binary address information signal by comparing the detection signal from the photodetector means with a reference level when the spot of the light beam is moved along the track; and demodulator means for demodulating the address information signal.

6. An optical disk drive comprising:

optical head means for projecting a light beam as a spot onto an optical disk;

photodetector means for detecting a variation in intensity of reflected light from the spot of the light beam and for transmitting a detection signal;

index mark detecting means for detecting an index mark and for generating an index mark detection signal, one index mark being formed on each track line on the optical disk, the index mark being optically readable, one track line representing one complete turn of a circular track on the optical disk;

optical head control means for moving the spot of the light beam to a desired track line in accordance with the photodetection signal;

formatting means for generating formatting data of address information of track and sectors in accordance with the index mark detection signal, the address information being necessary for recording, reproduction and erasing of desired information;

recording means for recording the address information on the desired track line in accordance with the formatting data;

polarized light splitter means for splitting the reflected light into first detection light and second detection light, polarization planes of the first detection light and second detection light being different from each other;

first photodetector means for detecting a variation in intensity of the first detection light and for generating a first detection signal;

second photodetector means for detecting a variation in intensity of the second detection light and for generating a second detection signal;

adder means for adding the first detection signal and second detection signal; and subtractor means for calculating a difference between the first detection signal and second detection signal.

7. An optical disk drive comprising:

optical head means for projecting a light beam as a spot onto an optical disk;

photodetector means for detecting a variation in intensity of reflected light from the spot of the light beam and for transmitting a detection signal;

index mark detecting means for detecting an index mark and for generating an index mark detection signal, one index mark being formed on each track line on the optical disk, the index mark being optically readable, one track line representing one complete turn of a circular track on the optical disk;

optical head control means for moving the spot of the light beam to a desired track line in accordance with the photodetection signal;

formatting means for generating formatting data of address information of track and sectors in accordance with the index mark detection signal, the address information being necessary for recording, reproduction and erasing of desired information; and recording means for recording the address information on the desired track line in accordance with the formatting data;

wherein the formatting means includes a formatting circuit for determining a start position of soft-formatting on the desired track line in accordance with the index mark detection signal; and wherein the optical head control means comprises:

counting means for counting the number of track lines crossed by the spot of the light beam;

optical head driving means for moving the optical head means in a radial direction of the optical disk;

comparator means for comparing numerated data of the counting means with a desired value; and driving signal generating means fur supplying a driving signal to the optical head driving means until the numerated data coincides with the desired value.

8. An optical disk drive comprising:

optical head means for projecting a light beam as a spot onto an optical disk;

photodetector means for detecting a variation in intensity of reflected light from the spot of the light beam and for transmitting a detection signal;

index mark detecting means for detecting an index mark and for generating an index mark detection signal, one index mark being formed on each track line on the optical disk, the index mark being optically readable, one track line representing one complete turn of a circular track on the optical disk;

optical head control means for moving the spot of the light beam to a desired track line in accordance with the photodetection signal;

formatting means for generating formatting data of address information of track and sectors in accordance with the index mark detection signal, the address information being necessary for recording, reproduction and erasing of desired information; and recording means for recording the address information on the desired track line in accordance with the formatting data;

wherein the formatting means includes a formatting circuit for determining a start position of soft-formatting on the desired track line in accordance wit the index mark detection signal; and further comprising:

hysteresis comparator means for generating a binary signal by comparing the detection signal with a first slice level and with a second slice level when the spot of the light beam crosses the track line, the second slide level being higher than the first slice level; and counting means for receiving the binary signal from the hysteresis comparator means and for counting the number of track lines crossed by the spot of the light beam, wherein a level of the binary signal turns from high to low in accordance with the comparison between the detection signal and the first slice level, while it turns form low to high in accordance with the comparison between the detection signal and the second slice level.

9. An optical disk drive comprising:

optical head means for projecting a light beam as a spot onto an optical disk;

photodetector means for detecting a variation in intensity of reflected light from the spot of the light beam and for transmitting a detection signal;

index mark detecting means for detecting an index mark and for generating an index mark detection signal, one index mark being formed on each track line on the optical disk, the index mark being optically readable, one track line representing one complete turn of a circular track on the optical disk;

optical head control means for moving the spot of the light beam to a desired track line in accordance with the photodetection signal;

formatting means for generating formatting data of address information of track and sectors in accordance with the index mark detection signal, the address information being necessary for recording, reproduction and erasing of desired information; and recording means for recording the address information on the desired track line in accordance with the formatting data;

wherein the formatting means includes a formatting circuit for determining a start position of soft-formatting on the desired track line in accordance wit the index mark detection signal; and wherein the optical disk drive satisfies the equation, $$Xt > \Delta y > Xs$$

where Xt denotes an amplitude of the detection signal, Xs denotes an amount of amplitude distortion of the detection signal, an $\Delta y$ denotes a difference between the second slide level and the first slice level.

* * * * *